(12) United States Patent
Ankel et al.

(10) Patent No.: US 8,976,654 B2
(45) Date of Patent: Mar. 10, 2015

(54) BURST AVOIDANCE IN UPLINK SYSTEMS

(75) Inventors: Par Ankel, Nodinge (SE); Rikard Kaer, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 292 days.

(21) Appl. No.: 13/359,971

(22) Filed: Jan. 27, 2012

(65) Prior Publication Data

US 2013/0107730 A1    May 2, 2013

Related U.S. Application Data

(60) Provisional application No. 61/554,692, filed on Nov. 2, 2011, provisional application No. 61/565,673, filed on Dec. 1, 2011.

(51) Int. Cl.
*H04W 28/12* (2009.01)
*H04W 88/08* (2009.01)
*H04W 88/02* (2009.01)
*H04W 28/02* (2009.01)

(52) U.S. Cl.
CPC .......... *H04W 28/0289* (2013.01); *H04W 88/08* (2013.01)
USPC .......................................... 370/232; 370/328

(58) Field of Classification Search
CPC .................................................... H04W 28/12
See application file for complete search history.

(56) References Cited

U.S. PATENT DOCUMENTS

2011/0083065 A1* 4/2011 Singh et al. .................. 714/807
2012/0282972 A1* 11/2012 Folkstedt et al. ............. 455/522

FOREIGN PATENT DOCUMENTS

WO    2007133135 A1    11/2007
WO    2009046760 A1    4/2009

OTHER PUBLICATIONS

3GPP, "3rd Generation Partnership Project; Technical Specification Group Radio Access Network; FDD Enhanced Uplink; Overall description; Stage 2 (Release 6)", 3GPP TS 25.309 V6.6.0, Mar. 2006, 34 pages.
3GPP, "3rd Generation Partnership Project; Technical Specification Group Radio Access Network; Physical channels and mapping of transport channels onto physical channels (FDD) (Release 10)", 3GPP TS 25.211 V10.0.0, Sep. 2010, 58 pages.

(Continued)

*Primary Examiner* — Jianye Wu
(74) *Attorney, Agent, or Firm* — Rothwell, Figg, Ernst & Manbeck, P.C.

(57) ABSTRACT

A method in a base station, and a base station, adapted for scheduling and receiving uplink transmissions from user entities and further forwarding data related to such transmissions to a core network, wherein the base station being adapted for transmitting serving grant signals for allowing a user entity to transmit uplink transmissions at a given maximum granted data rate, at least at a subsequent transmission opportunity. An uplink transmission from a user entity may be responded to by the base station by a not-acknowledge, NACK, or an acknowledge, ACK, signal. The method comprises the steps of: detecting the rate of an uplink transmission; detecting whether an overload situation exists, and if the rate exceeds the granted rate and an overload situation exists, sending an ACK to the user entity without forwarding any uplink data to the core network.

24 Claims, 12 Drawing Sheets

(56) References Cited

OTHER PUBLICATIONS

3GPP, "3rd Generation Partnership Project; Technical Specification Group Radio Access Network; Physical layer procedures (FDD) (Release 10)", 3GPP TS 25.214 V10.4.0, Sep. 2011, 100 pages.
3GPP, "3rd Generation Partnership Project; Technical Specification Group Radio Access Network; Medium Access Control (MAC) protocol specification (Release 10)", 3GPP TS 25.321 V10.4.0, Sep. 2011, 198 pages.
International Search Report and Written Opinion from PCT/EP2012/063895; dated Jan. 23, 2013; 13 pages.
Rohde & Schwarz, "High Speed Uplink Packet Access (HSUPA) White Paper", Aug. 3, 2006, 39 pages.

* cited by examiner

| NODE B | | | | UE | | |
|---|---|---|---|---|---|---|
| HARQ PROCESS | E-HICH ACK/NACK | IuB PROT | GRANT ALL SCOPE | PERCEIVED GRANT | E-DCH TRANSMISSION | RSN |
| 0 | | | | | DTX | |
| 1 | | | | | DTX | |
| 2 | | | | | DTX | |
| 3 - 601 | ACK | DATA | E-TFCI 30 | CORRECT AG E-TFCI 30 | 30 | 0 |
| 4 | ACK | DATA | | | 30 | 0 |
| 5 - 603 | ACK | DATA | | | 30 | 0 |
| 6 - 604 | NACK | | | GHOST AG E-TFCI 120 "All HARQ" | 120 | 0 |
| 7 - 608 | NACK | | | | 120 | 0 |
| 0 | NACK | | | | 120 | 0 |
| 1 | NACK | | | | 120 | 0 |
| 2 | NACK | | | | 120 | 0 |
| 3 | NACK | | | | 120 | 0 |
| 4 | NACK | | | | 120 | 0 |
| 5 | NACK | | | | 120 | 0 |
| 6 - 610 | NACK | | REPEAT E-TFCI 30 | CORRECT AG E-TFCI 30 | 120 | 1 |
| 7 | NACK | | | | 120 | 1 |
| 0 | NACK | | | | 120 | 1 |
| 1 | NACK | | | | 120 | 1 |
| 2 | NACK | | | | 120 | 1 |
| 3 | NACK | | | | 120 | 1 |
| 4 | NACK | | | | 120 | 1 |
| 5 | NACK | | | | 120 | 1 |
| 6 | NACK | | | | 120 | 2 |
| 7 | NACK | | | | 120 | 2 |
| 0 | NACK | | | | 120 | 2 |
| 1 | NACK | | | | 120 | 2 |
| 2 | NACK | | | | 120 | 2 |
| 3 | NACK | | | | 120 | 2 |
| 4 | NACK | | | | 120 | 2 |
| 5 | NACK | | | | 120 | 2 |
| 6 - 613 | ACK | DATA | | | 30 | 0 |
| 7 | ACK | DATA | | | 30 | 0 |
| 0 | ACK | DATA | | | 30 | 0 |
| 1 | ACK | DATA | | | 30 | 0 |
| 2 | ACK | DATA | | | 30 | 0 |
| 3 | ACK | DATA | | | 30 | 0 |
| 4 | ACK | DATA | | | 30 | 0 |
| 5 | ACK | DATA | | | 30 | 0 |

FIG. 8

| NODE B | | | | UE | | |
|---|---|---|---|---|---|---|
| HARQ PROCESS | E-HICH ACK/NACK | IuB PROT | GRANT ALL SCOPE | PERCEIVED GRANT | E-DCH TRANSMISSION | RSN |
| 0 | | | | | DTX | |
| 1 | | | | | DTX | |
| 2 | | | | | DTX | |
| 3 | ACK | DATA | E-TFCI 30 | CORRECT AG E-TFCI 30 | 30 | 0 |
| 4 | ACK | DATA | | | 30 | 0 |
| 5 | ACK | DATA | | | 30 | 0 |
| 6 - 704 | ACK* | | | GHOST AG E-TFCI 120 "All HARQ" | 120 | 0 |
| 7 | ACK* | | | | 120 | 0 |
| 0 | ACK* | | | | 120 | 0 |
| 1 | ACK* | | | | 120 | 0 |
| 2 | ACK* | | | | 120 | 0 |
| 3 | ACK* | | | | 120 | 0 |
| 4 | ACK* | | | | 120 | 0 |
| 5 | ACK* | | | | 120 | 0 |
| 6 - 710 | ACK | DATA | REPEAT E-TFCI 30 | CORRECT AG E-TFCI 30 | 30 | 0 |
| 7 | ACK | DATA | | | 30 | 0 |
| 0 | ACK | DATA | | | 30 | 0 |
| 1 | ACK | DATA | | | 30 | 0 |
| 2 | ACK | DATA | | | 30 | 0 |
| 3 | ACK | DATA | | | 30 | 0 |
| 4 | ACK | DATA | | | 30 | 0 |
| 5 | ACK | DATA | | | 30 | 0 |
| 6 | ACK | DATA | | | 30 | 0 |
| 7 | ACK | DATA | | | 30 | 0 |
| 0 | ACK | DATA | | | 30 | 0 |
| 1 | ACK | DATA | | | 30 | 0 |
| 2 | ACK | DATA | | | 30 | 0 |
| 3 | ACK | DATA | | | 30 | 0 |
| 4 | ACK | DATA | | | 30 | 0 |
| 5 | ACK | DATA | | | 30 | 0 |
| 6 | ACK | DATA | | | 30 | 0 |
| 7 | ACK | DATA | | | 30 | 0 |
| 0 | ACK | DATA | | | 30 | 0 |
| 1 | ACK | DATA | | | 30 | 0 |
| 2 | ACK | DATA | | | 30 | 0 |
| 3 | ACK | DATA | | | 30 | 0 |
| 4 | ACK | DATA | | | 30 | 0 |
| 5 | ACK | DATA | | | 30 | 0 |

FIG. 9

| NODE B | | | | UE | | |
|---|---|---|---|---|---|---|
| HARQ PROCESS | E-HICH ACK/NACK | IuB PROT | GRANT SINGLE SCOPE | PERCEIVED GRANT | E-DCH TRANSMISSION | RSN |
| 0 | | | | | DTX | |
| 1 | | | | | DTX | |
| 2 | | | | | DTX | |
| 3 - 801 | ACK | DATA | E-TFCI 97 | CORRECT AG E-TFCI 97 | 97 | 0 |
| 4 | | | | | DTX | |
| 5 | | | | | DTX | |
| 6 - 803 | NACK | | | GHOST AG E-TFCI 80 "All HARQ" | 80 | 0 |
| 7 | NACK | | | | 80 | 0 |
| 0 | NACK | | | | 80 | 0 |
| 1 | NACK | | | | 80 | 0 |
| 2 | NACK | | | | 80 | 0 |
| 3 - 805 | ACK | DATA | | | 80 | 0 |
| 4 - 807 | NACK | | | | 80 | 0 |
| 5 | NACK | | | | 80 | 0 |
| 6 - 809 | NACK | | DEACTIVATE | DEACTIVATE | 80 | 1 |
| 7 | NACK | | DEACTIVATE | DEACTIVATE | 80 | 1 |
| 0 | NACK | | DEACTIVATE | DEACTIVATE | 80 | 1 |
| 1 | NACK | | DEACTIVATE | DEACTIVATE | 80 | 1 |
| 2 | NACK | | DEACTIVATE | DEACTIVATE | 80 | 1 |
| 3 - 811 | ACK | DATA | REPEAT E-TFCI 97 | CORRECT AG E-TFCI 97 | 97 | 0 |
| 4 | NACK | | DEACTIVATE | DEACTIVATE | 80 | 1 |
| 5 | NACK | | DEACTIVATE | DEACTIVATE | 80 | 1 |
| 6 | NACK | | | | 80 | 2 |
| 7 | NACK | | | | 80 | 2 |
| 0 | NACK | | | | 80 | 2 |
| 1 | NACK | | | | 80 | 2 |
| 2 | NACK | | | | 80 | 2 |
| 3 | ACK | DATA | | | 97 | 0 |
| 4 | NACK | | | | 80 | 2 |
| 5 | NACK | | | | 80 | 2 |
| 6 | | | | | DTX | |
| 7 | | | | | DTX | |
| 0 | | | | | DTX | |
| 1 | | | | | DTX | |
| 2 | | | | | DTX | |
| 3 | ACK | DATA | | | 97 | 0 |
| 4 | | | | | DTX | |
| 5 | | | | | DTX | |

FIG. 10

| NODE B | | | | UE | | |
|---|---|---|---|---|---|---|
| HARQ PROCESS | E-HICH ACK/NACK | IuB PROT | GRANT SINGLE SCOPE | PERCEIVED GRANT | E-DCH TRANSMISSION | RSN |
| 0 | | | | | DTX | |
| 1 | | | | | DTX | |
| 2 | | | | | DTX | |
| 3 | ACK | DATA | E-TFCI 97 | CORRECT AG E-TFCI 97 | 97 | 0 |
| 4 | | | | | DTX | |
| 5 | | | | | DTX | |
| 6 - 903 | ACK* | | | GHOST AG E-TFCI 80 "All HARQ" | 80 | 0 |
| 7 | ACK* | | | | 80 | 0 |
| 0 | ACK* | | | | 80 | 0 |
| 1 | ACK* | | | | 80 | 0 |
| 2 | ACK* | | | | 80 | 0 |
| 3 | ACK | DATA | | | 80 | 0 |
| 4 | ACK* | | | | 80 | 0 |
| 5 | ACK* | | | | 80 | 0 |
| 6 - 909 | | | DEACTIVATE | DEACTIVATE | DTX | |
| 7 | | | DEACTIVATE | DEACTIVATE | DTX | |
| 0 | | | DEACTIVATE | DEACTIVATE | DTX | |
| 1 | | | DEACTIVATE | DEACTIVATE | DTX | |
| 2 | | | DEACTIVATE | DEACTIVATE | DTX | |
| 3 - 910 | ACK | DATA | REPEAT E-TFCI 97 | CORRECT AG E-TFCI 97 | 97 | 0 |
| 4 | | | DEACTIVATE | DEACTIVATE | DTX | |
| 5 | | | DEACTIVATE | DEACTIVATE | DTX | |
| 6 | | | | | DTX | |
| 7 | | | | | DTX | |
| 0 | | | | | DTX | |
| 1 | | | | | DTX | |
| 2 | | | | | DTX | |
| 3 | ACK | DATA | | | 97 | 0 |
| 4 | | | | | DTX | |
| 5 | | | | | DTX | |
| 6 | | | | | DTX | |
| 7 | | | | | DTX | |
| 0 | | | | | DTX | |
| 1 | | | | | DTX | |
| 2 | | | | | DTX | |
| 3 | ACK | DATA | | | 97 | 0 |
| 4 | | | | | DTX | |
| 5 | | | | | DTX | |

FIG. 11

BURST AVOIDANCE IN UPLINK SYSTEMS

This application claims the benefit of (1) U.S. Provisional Patent Application No. 61/554,692, filed Nov. 2, 2011, and (2) U.S. Provisional Patent Application No. 61/565,673, filed Dec. 1, 2011. The identified applications are incorporated by reference herein in their entirety.

TECHNICAL FIELD

This invention is directed to uplink resource handling for user entities, base stations and networks. More particularly, the invention relates to systems and methods where the uplink rate is regulated by the base station or other node, which uplink rate may potentially be violated by user entities. One aspect of the invention relates to relative and/or absolute grant signalling as well as ACKJNACK signalling in Enhanced Uplink (HSUPA) and the handing of uplink transmissions both with regard to the air interface and the throughput as seen from the user entities.

BACKGROUND

Release 6 of the WCDMA (Wideband Code Division Multiple Access) specification—for instance in prior art document 3GPP TS 25.309, "FDD Enhanced Uplink; Overall Description; Stage 2", Version V6.6.0 of 2006-04-06—discloses a High Speed Uplink Packet Access (HSUPA), also called Enhanced Uplink, communication scheme. The HSUPA aims to match the bit rates provided by the downlink High Speed Data Packet Access (HSDPA) scheme, so as to cater for improved interactive, background and streaming services.

Relevant sections can moreover be found in 3GPP References TS25.211 and TS25.321—MAC protocol specification. 25.214 Physical Layer Procedures (FDD). 25.321 MAC protocol specification.

FIG. 1, a HSUPA network overview is indicated (HSDPA related channels are not included in the figure). The network comprises a Core Network communicating with a Radio Network Controller (RNC, S-RNC, D-RNC (Drifting-RNC)) over the Iu interface, or Iur interface; a first base station, Node B, B1, a second base station, Node B, B2, both base stations comprising a EUL scheduler unit. The EUL Scheduler (EUL_SCH) is also denoted the MAC-e Scheduler, and communicating with the RNC over respective Iub interfaces.

The following HSUPA channels are transmitted over the air interface; the E-AGCH to convey absolute grant signalling from the MAC-e scheduler towards the UEs, the E-RGCH for relative grant signalling, E-HICH to convey acknowledgement feedback from Node-B decoding of UE transmitted data, Dedicated Physical Channel (DPCH) or Fractional DPCH to convey Transmit Power Control (TPC) commands, Enhanced DPDCH (E-DPDCH) to convey the MAC-e payload and Enhanced DPCCH (E-DPCCH) to convey the control signalling of the MAC-e.

Node B1 corresponds to the serving cell in this example (E-AGCH is only transmitted from the serving cell) and node B2 corresponds to a non-serving cell.

Document 3GPP TS 25.309 FDD, Enhanced Uplink Overall description, mentioned above gives an overview of the Enhanced Uplink functionality.

An overview of the HSUPA can also be found in prior art document "High Speed Uplink Packet Access (HSUPA); White Paper, application note 1MA94", Rohde Schwarz, January 2006, retrieved on the internet on 2011 Oct. 24.

According to the HSUPA specification, the Enhanced Dedicated Channel (E-DCH) high speed uplink transport channel offers a number of features such as: short Transmission Time Interval (TTI), Fast Hybrid Automatic Repeat Request (ARQ) with soft recombining, fast scheduling for reduced delays, increased data rates and increased capacity.

When a UE is setting up communication with a Node B, the setup procedure may be followed by a HSDPA session, for e.g. downloading/surfing an internet page using TCP. Depending on the capabilities of the user entity, this may moreover involve HSUPA transmissions whereby the Node B that transmits TCP messages on the HSDPA downlink channel will receive TCP acknowledgements on the E-DCH uplink to Node B. Since Node-B determines, or schedules, at which pace a UE shall transmit on E-DCH, Node-B utilises the E-AGCH to convey scheduling decisions. A shorter delay, measured from the time until a TCP data segment is sent downlink until a TCP acknowledgement is sent on the uplink as a response, leads to a decreased downloading time of file transfers etc. due to the shorter round trip time estimate of the TCP layer.

In order to use a HSUPA service with Node B, the user entity is informed about which E-AGCH code it is supposed to receive downlink traffic on. For this purpose, the E-AGCH, which is a shared channel within the cell, is used. The E-AGCH can be defined to have a number of one to several channelization codes.

E-AGCH channels are configured to a Node B in a configuration or re-configuration procedure with the RNC via the NBAP (Node B Application Part) signalling protocol.

HSUPA is similar in many respects to HSDPA. However, unlike HSDPA, HSUPA does not utilize a shared channel for data transfer in the uplink. In W-CDMA, each UE already uses a unique scrambling code in the uplink so each UE already has a dedicated uplink connection to the network with more than ample code channel space in that connection. This is in contrast to the downlink where the Node B uses a single scrambling code and then assigns different OVSF channelization codes to different UE's. The shared resource in the uplink is actually the interference level at the Node B, which the network manages through the fast closed loop power control algorithm. The fact that the UE has a dedicated connection to the network in the uplink influences the design of HSUPA quite considerably. The goals of HSUPA were to support fast scheduling (which allows the network to rapidly effect a change of which UE's that should transmit and at what rate) and to reduce the overall transmission delay. Transmission delay reduction is achieved through fast HARQ (hybrid automatic repeat request) retransmissions, in a manner very similar to HSDPA and at an optional shorter 2 ms TTI. As the primary shared resource on the uplink is the total power arriving at the base station, HSUPA scheduling is performed by directly controlling the maximum amount of power that a UE can use to transmit with at any given point in time.

The network has two methods for controlling the UE's transmit power on the E-DPDCH; it can either use a non-scheduled grant or a scheduled grant. In the non-scheduled grant the network simply tells the UE the maximum block size that it can transmit on the E-DCH during a TTI. This block size is signalled at call setup and the UE can then transmit a block of that size or less in each TTI until the call ends or the network modifies the non-scheduled grant via an RRC reconfiguration procedure. The block size deterministically maps to a power level, which is also configured by the network during call setup. The non-scheduling grant is most suited for constant-rate delay-sensitive application such as voice-over-IP.

Regarding the scheduled grant, the UE maintains a Serving Grant that it updates based on information received from the network. The Serving Grant directly specifies the maximum power that the UE can use on the E-DPDCH in the current TTI. As E-DCH block sizes map deterministically to power levels, the UE can translate its Serving Grant to the maximum E-DCH block size it can use in a TTI (the mapping of power levels is determined by the E-TFCI (The E-TFCI (E-DCH Transport Format Combination Identifier) includes information about the transport block set size, which is related to the data rate) Reference Power Offsets that are signalled at call setup).

There are two ways the network can control the UE's Serving Grant. The first is through an absolute grant, transmitted on the shared E-AGCH downlink channel, which signals a specific, absolute number for the Serving Grant. The other way is through relative grants, transmitted using the downlink E-RGCH channels, that incrementally adjust a UE's Serving Grant up or down from its current value. At any given point in time, the UE will be listening to a single E-AGCH from its serving cell and to one or more E-RGCH's. The E-AGCH is a shared channel so the UE will only update its Serving Grant if it receives a block on the E-AGCH that is destined for it (the E-RNTI identity signalled at call setup is used on the E-AGCH to direct transmissions to particular UE's). The E-AGCH transmission contains an Absolute Grant Value and an Absolute Grant Scope. The value corresponds to a maximum rate and the scope can be set to either "all HARQ processes" or "per HARQ process", c.f. 3GPP 25.321. The E-RGCH is also shared by multiple UEs, but on this channel the UE is listening for a particular orthogonal signature rather than a higher layer identity. If it does not detect its signature in a given TTI, it interprets this as a "Hold" command and thus makes no change to its Serving Grant.

The Node B MAC-e Scheduler issues absolute grants on the downlink E-AGCH channel, that is, messages which grant the user entity the right to transmit at given bit rates on the uplink. Since bandwidth needs vary dynamically over time, it is desirable that the power emissions by user entities are regulated speedily so that bandwidth is not unnecessarily wasted. User entities transmit requests as Happy/Not Happy concerning their need for higher speeds.

There is a risk that an UE falsely detects an absolute grant that was not transmitted, also called a ghost grant. Such a ghost grant may cause the UE to transmit on a rate that NodeB is not ready to receive at.

The inventors have found that according to the current standardized specification, Node B will in such situation, where a ghost grant is detected by the UE; send a NACK on E-HICH. It will also send a new Absolute Grant to avoid the problem for new UE transmissions. However, the 3GPP standard allows for the UE to re-transmit at a previous grant level, but since Node B still has no resources to decode transmissions, it will also fail and a new NACK is sent. This will go on until the maximum allowed number of re-transmissions are reached (e.g. 7) which will cause a substantial amount of interference in the cell. Eventually, the UE will give up and stop transmitting, which subsequently will lead to an upper layer RLC (Radio Link Control layer) re-transmission.

According to the inventors, the risk for false detection of E-AGCH, for a 2 ms TTI UE can be assessed as follows: In one minute there are 30.000 TTIs. With 16 bit CRC (Cyclic Redundancy Check) there are 65.536 combinations. In lab and field tests one typically experiences a false E-AGCH (E-AGCH: E-DCH Absolute Grant Channel) detection in a UE in the interval of a few minutes.

In FIG. 2, an exemplary situation—as perceived by the inventors—is shown where a UE still has data to transmit but where the UE has not been awarded any grant. By way of example, the UE detects in 11 a ghost grant at HARQ process 4 that is valid for all HARQs, which seemingly makes it possible to transmit on E-TFCI 84. NodeB detects the problem and issues a new grant in 12 for deactivating all HARQ's. In the example, Node B does however not has the ability to decode the unexpected UE transmission so Node B additionally responds by transmitting a NACK. This pattern continues for all 8 HARQ's with initial transmission, RSN (Retransmit Sequence Number)=0. Thereafter, further re-transmissions follow and the pattern can continue for up to 7 re-transmissions for 2 ms TTI configuration. It is noted that the Node B manufacturer/operator may choose the maximum number of possible retransmissions and that longer maximum retransmission numbers aggravate the problem. At this point in time, the procedure stops, 13, since UE has reached a maximum number of retransmissions and must abort those transmissions. New transmissions must follow that last received grant, which is the one received at 12 that do not allow any more transmissions.

The inventors have found that ghost grants cause serious problems for TD (Time Division) scheduling. Under TD scheduling, the UE has only a grant on one or a few HARQ processes, while the other HARQ processes are deactivated from scheduled data. If a ghost grant valid for all HARQs is detected in the UE, the UE suddenly starts to transmit on all HARQ process and sometimes at a very high rate. Even though there may be no resources available in Node B to decode the transmissions, the UE continues up to 8 HARQ cycles, i.e. 8*16 ms.

The problem is predominant for TD scheduling, since if a UE has a grant in only 1 HARQ out of 8, then processing resources can not be reserved for all 8.

SUMMARY

It is a first object of the invention to improve the uplink resource allocation for a base station.

This object has been accomplished by a method in a base station, adapted for scheduling and receiving uplink transmissions from user entities and further forwarding data related to such transmissions to a core network, wherein the base station being adapted for transmitting serving grant signals for allowing a user entity to transmit uplink transmissions at a given maximum granted data rate, at least at a subsequent transmission opportunity. An uplink transmission from a user entity may be responded to by the base station by a not-acknowledge, NACK, or an acknowledge, ACK, signal. The method comprises the steps of: detecting the rate of an uplink transmission; detecting whether an overload situation exists; and if the rate exceeds the granted rate and an overload situation exists, sending an ACK to the user entity, although without forwarding any uplink data to the core network.

According to a further aspect, the method is further detecting whether a decoding success exists, and if so transmitting an ACK and forwarding data to the core network.

According to a further aspect, the step of detecting whether the detected rate exceeds the granted rate and/or the step of detecting whether an overload situation exists is/are performed upon detecting a decoding success does not exist.

Another embodiment provides further that the method is detecting whether a decoding success exists, and if the detected rate does not exceed the granted rate and a decoding success exists, then transmitting an ACK and forwarding the received uplink data to the core network.

A further aspect provides that the step of detecting a decoding success is performed upon detecting that the detected rate does not exceed the granted rate or upon that no overload situation is found to exist.

There is also provided a base station comprising a scheduler, the scheduler being adapted for scheduling and receiving uplink transmissions from user entities and further delivering data related to such uplink transmissions to a core network.

The base station is being adapted for transmitting serving grant signals for allowing a user entity to transmit uplink transmissions at a given maximum granted data rate, at least at a subsequent transmission opportunity; wherein an uplink transmission from a user entity may be responded to by the scheduler by a not-acknowledge, NACK, or an acknowledge, ACK, signal. The scheduler further being adapted for: detecting the rate of an uplink transmission and detecting whether an overload situation exists. The scheduler further being adapted such that, if the rate exceeds the granted rate and an overload situation exists, the scheduler sends an ACK to the user entity, although without forwarding any uplink data to the core network.

According to the invention, long re-transmission tails at levels that are higher than granted are effectively prevented or at least substantially prevented. The long tails of transmissions of un-proportionately high grant levels cause interference in the cell and can cause instabilities; hence the invention provides less interference and more stability.

For implementations in HSUPA, the effects of the invention can be observed by using a UE, monitoring the E-HICH on which ACK and NACK are transmitted and the Iub UL (uplink) FP (frame protocol).

According to the invention, sending an ACK even when the decoding failed will lead to an upper layer RLC re-transmission, which secures that packet transmissions are continued with and successfully carried out. The same applies, if all re-transmissions are performed and become answered by a NACK.

Further advantages of the invention will appear from the following detailed description of the invention.

BRIEF DESCRIPTION OF THE DRAWINGS

FIG. 8 is an exemplary scenario of an all-grant HARQ process according to the prior art.

FIG. 9 is an exemplary scenario for an all-grant HARQ process for the embodiment shown in FIG. 4.

FIG. 10 is an exemplary scenario of a single-grant HARQ process according to the prior art.

FIG. 11 is an exemplary scenario for a single-grant HARQ process for the invention shown in FIG. 4.

DETAILED DESCRIPTION

First Embodiment of the Invention

According to 3GPP 25.321, NACK shall be sent if data can not be delivered or decoded. For example in 4.2.4.5 MAC-e entity—UTRAN Side or 4.2.4.8 MAC-i entity—UTRAN Side: One HARQ entity is capable of supporting multiple instances (HARQ processes) of stop and wait HARQ protocols. Each process is responsible for generating ACKs or NACKs indicating delivery status of E-DCH transmissions.

The present invention deviates from the 3GPP specific Node B behaviour under certain conditions.

For instance, when Node B detects that UE is transmitting at a higher granted E-TFCI than it should and there are no processing resources available to decode such transmissions in Node B, instead of causing a long E-DCH re-transmission tail, node B transmits an ACK to "stop" the UE transmitting.

One aspect of the first embodiment of the method involves at least two routines working in parallel. On the one hand and ACKfNACK is performed for respective HARQ processes. On the other hand the grant level is determined and regulated for HARQ processes.

Figure 1:
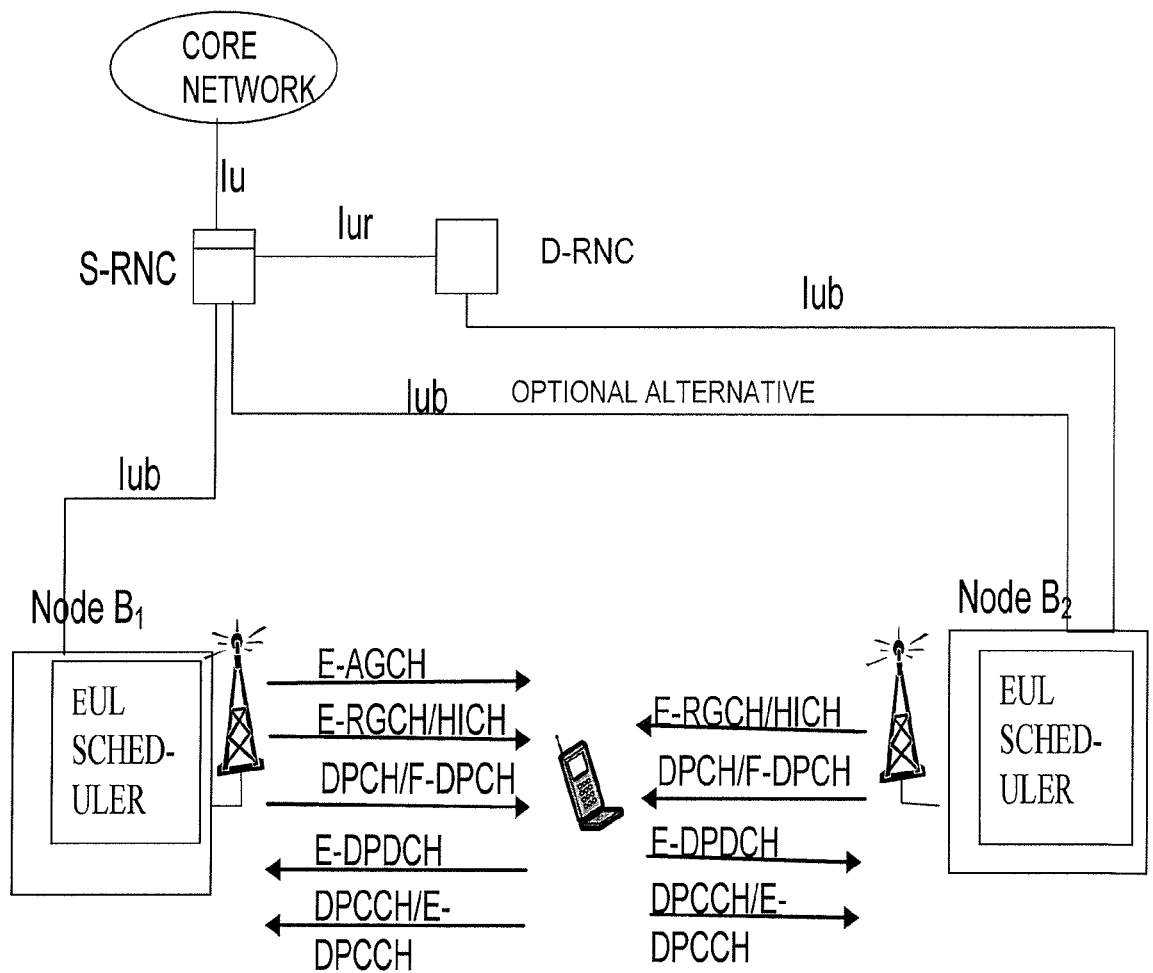
FIG. 1 shows basic elements of a prior art HSUPA network and signalling.
Figure 2:
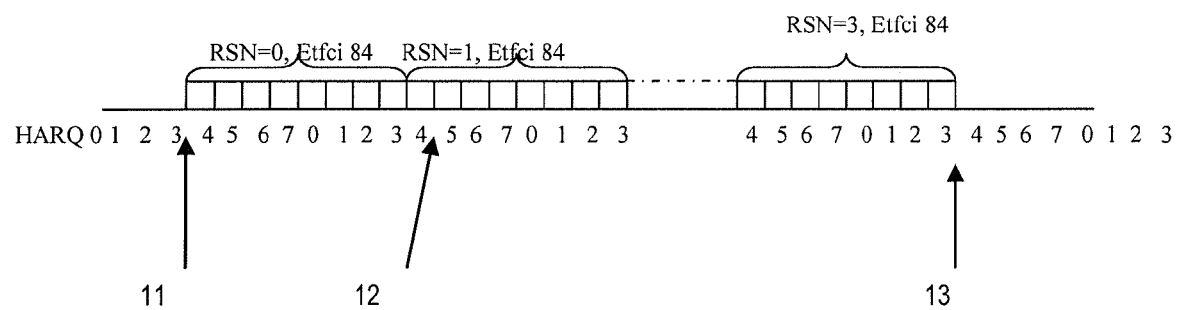
FIG. 2 shows a scenario in the prior art.
Figure 3:
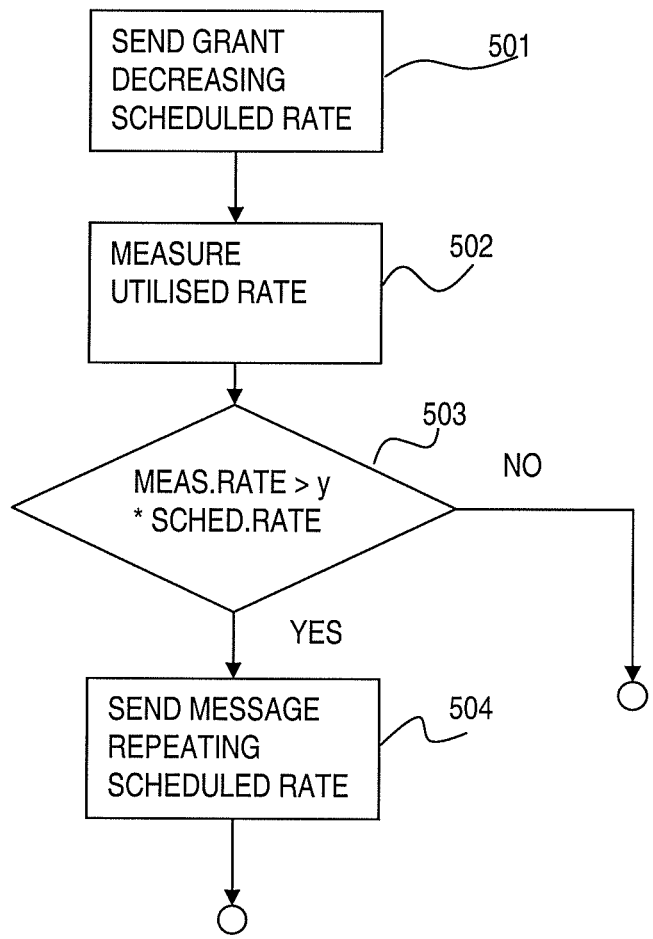
FIG. 3 shows a detail of a method, which is used in embodiments of the invention.
Figure 5:
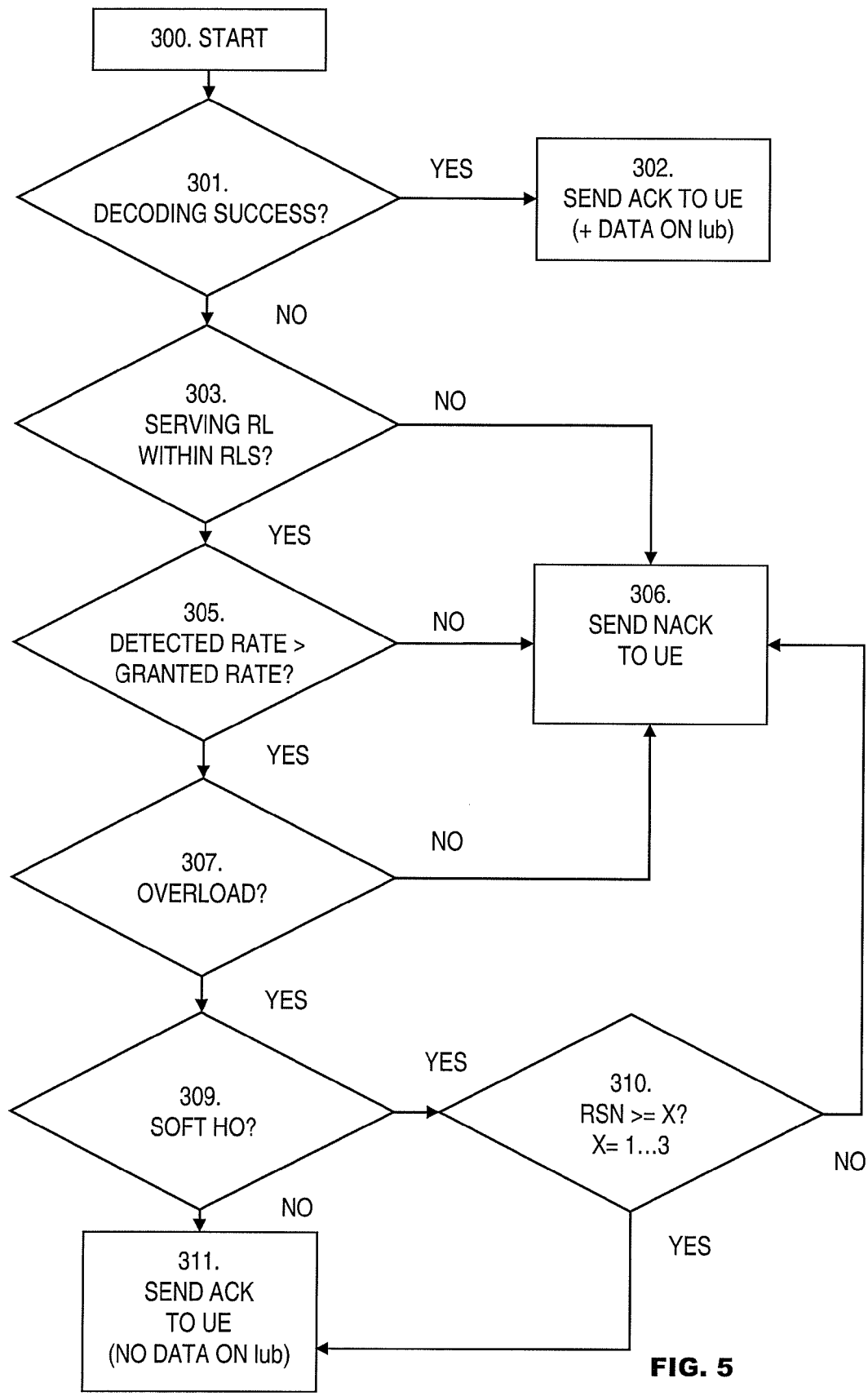
FIG. 5 shows a second embodiment of a method according to the invention.

According to the invention, the grant may be reduced to the level decided by an enhanced uplink capable Node B, according to a grant violation detection in a similar manner as explained in prior art document WO2007/133135 (FIG. 5, claim 22). In this document a control mechanism is disclosed, which assures that the scheduling decisions are really handled by the user terminal UE. The downlink transmission with the E-DCH channel scheduled grant is repeated, which gives the user terminal a new chance to detect the scheduled grant. It is only repeated when the scheduled data rate detected is higher than the maximum data rate, which means that it is only repeated when necessary. This mechanism is shown in FIG. 3, in which a grant is sent with a decreasing scheduled rate 501. The utilised rate is measured 502. The Node B NB detects the (actual) scheduled data rate of the uplink data traffic on the E-DCH by decoding the E-DPDCH and/or the E-DCH Transport Format Combination Indicator (E-TFCI). One of E-DPDCH and E-TFCI or both are used to derive the actual data rate. E-TFCI is a value indicating the size of (i.e. how many bits are contained in) the transport block—the payload unit sent on E-DCH in one TTI. A check is made in step 503 to verify if the measured rate is greater than the (granted) scheduled rate multiplied with a fraction y. If this is the case, a new grant, step 504, is sent to the user entity repeating the (reduced) scheduled rate, corresponding to an earlier granted rate, since it is assumed that the UE did not receive the earlier grant message. If instead the measured rate does not exceed the scheduled rate multiplied with a fraction y, no repetition is made.

Figure 4:
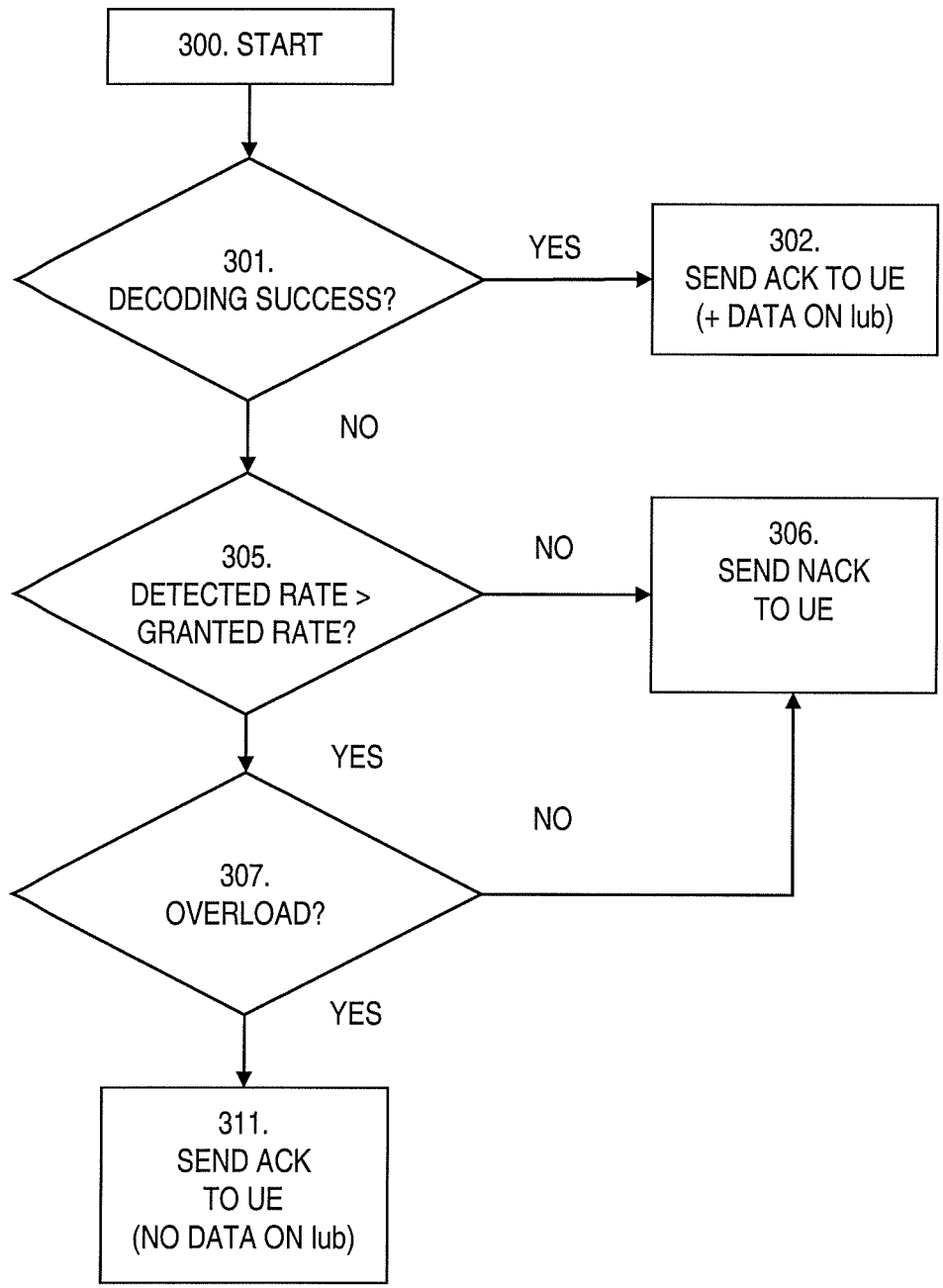
FIG. 4 shows a first embodiment of a method according to the invention.

According to the present invention, the fraction y may be further chosen as 1, such that if the detected rate exceeds the granted rate, the granted rate is repeated, and such that step 102 in FIG. 3 is the same test as step 305 of e.g. FIG. 4, although belonging to two parallel processes.

In FIG. 4, a first embodiment of a method for being performed in Node B according to the invention is shown.

For each TTI and RLS it is detected if the transmitted uplink rate exceeds the granted rate. The detected up-link rate is derived from E-DPCCH detection and E-TFCI.

Step 300: The process starts.

Step 301: The uplink transmission is attempted to be decoded and if the decoding is successful, the base station is transmitting an ACK, 302, to the user entity while forwarding the received uplink data to the core network, which for HSUPA is forwarded on the Iub interface. If the decoding is not successful, go to step 305.

Step 305: It is evaluated whether the detected rate exceeds the granted rate. If this is not the case, the method goes to step 306 in which a NACK is transmitted. If the detected rate is higher than the granted rate, the method proceeds to step 307. The detected rate according to an embodiment of the invention may be derived from the E-TFCI mentioned above on the E-DPCCH.

Step 307: The base station checks if an overload situation has occurred, if so, the method goes to step 311 and if not, the method goes to step 306.

According to a further aspect of the invention, the test of overload 307 may involve a test as to whether sufficient processing resources are available in Node B to decode future E-DPDCH transmissions. Some Node Bs might use a more static resource allocation than others. By example, fluctuating resource availability could involve that no processing resource would be available at a present TTI, but sufficient processing resources would be available when the respective HARQ process appears again 16 ms later. The test according to the invention as to whether an overload situation pertains could in such an example be considered as "yes". Another overload situation could pertain to the interference on the radio interface for the base station exceeding a predetermined interference level. The overload detection could also pertain to a combination of the above parameters.

Step 311: The base station sends and ACK without forwarding uplink data towards the core network since no such data have been received successfully by the base station due to the failed decoding success. For HSUPA, Node B Transmits an ACK on E-HICH, to stop the UE transmission on this HARQ process. Note that if Node B perfolins a misdetection and derive a non-existing E-TFCI there is no immediate "harm" in sending either ACK or NACK to the UE. Note also that the above method will not lead to a HARQ failure.

In other words there is provided a method in a base station, adapted for scheduling and receiving uplink transmissions from user entities and further forwarding data related to such transmissions to a core network. The base station being adapted for transmitting serving grant signals for allowing a user entity to transmit uplink transmissions at a given maximum granted data rate, at least at a subsequent transmission opportunity; wherein an uplink transmission from a user entity may be responded to by the base station by a not-acknowledge, NACK, or-an acknowledge, ACK, signal. The method comprising the steps of: detecting 305 the rate of an uplink transmission; detecting 307 whether an overload situation exists; if the rate exceeds the granted rate 305 and an overload situation exists 307, sending 311 an ACK to the user entity, although without forwarding any uplink data to the core network.

The method may moreover comprise the step detecting whether a decoding success exists 301, and if so transmitting 302 an ACK and forwarding data to the core network.

In the FIG. 4 embodiment, the step of detecting 305 whether the detected rate exceeds the granted rate and/or the step of detecting 307 whether an overload situation exists is/are performed upon detecting a decoding success does not exist 301.

Further according to this embodiment, upon detecting that a decoding success does not exist, if either the detected rate does not exceed the granted rate 305 or if no overload situation is found to exist 307 transmitting 306 a NACK to the user entity.

The effect of step 311 shall be further described with regard to FIGS. 8-11.

In FIG. 5, a second embodiment of the invention, soft handover, HO, is considered.

Elements having common reference numbers with FIG. 4 have the same functions and the description for these elements shall therefore not be repeated. This embodiment comprises the additional step of 303 and/or potentially also of 309. A further option comprises 309 and step 310. A still further option comprises all steps 303, 309 and 310.

In FIG. 5, after yes in step 301, the method proceeds to step 303.

Step 303: The base station checks if the UE's radio link, RL, is the serving RL or in other words that the serving radio link is within the radio link set (RLS). In case of HSUPA, the Node B handling the serving RL has control of the E-AGCH channel (and serving E-RGCH channel) and therefore has knowledge about the maximum grant. The Node B with only non-serving RL (Radio Link) is not aware of the maximum grant. If the serving radio link is within the RLS, go to step 305. If no, go to step 306.

Step 309: Is the UE transmitting to Node B in soft handover? If so, proceed to step 310, if not, proceed to step 311.

For instance, in step 310 it is checked if the transmission is a retransmission and if the transmission number is exceeding a predefined retransmission number, e.g. X=1 . . . 3, where X is a predetermined number depending on configuration. If no, the base station issues a NACK step 306. For retransmission numbers above the predefined re-transmission number, an ACK is transmitted, step 311. It is noted that the maximum number of retransmission numbers in the current standard can be set to e.g. 7, so the predefined number has to be chosen so as to be lower than the maximum number, for this option of the embodiment.

When a UE is transmitting in soft handover where two base stations are receiving the uplink transmission, the other base station for which the present node B carrying out the method according to the invention has no knowledge could potentially contribute to the transmission being correctly decoded. Therefore, to allow the benefits of soft handover to be utilized and transmissions to be correctly decoded by Node B, the method of this embodiment responds with a NACK for initial retransmissions, c.f. step 310, and with an ACK step for subsequent retransmissions, while being in soft handover.

In an embodiment, where step 309 is provided but step 310 is not provided, the method goes from 309 to 306 in case of yes, that is transmits a NACK if in soft handover.

In other words, having regard to FIG. 5, there is provided a method, further comprising the step of detecting whether the serving radio link pertaining to the base station is within a radio link set 303, and if this is not the case, upon detecting that a decoding success does not exist, transmitting a NACK 306.

The FIG. 5 method further comprises the step of detecting whether the serving radio link is within the radio link set 303, and the transmission of an ACK 311 without forwarding any uplink data to the core network being further conditioned on that the serving radio link is within the radio link set 303.

As shown in FIG. 5, the method may further comprising the step of detecting 309 whether the user entity is in soft handover with regard to the base station, the transmission of an ACK 311 without forwarding any uplink data to the core network being further conditioned on that the transmission from the user entity is not being in soft handover 309.

Moreover, the FIG. 5 method further comprises the step of detecting 309 whether the user entity is in soft handover with regard to the base station and the step of detecting the retransmission number for the uplink transmission, wherein the transmission of an ACK 311 without forwarding any uplink data to the core network being further conditioned on that the transmission from the user entity is not being in soft handover 309 and the transmission from the user entity is a retransmission 310 having a retransmission number above or equal to a predefined number (X=1 . . . 3).

Figure 6:
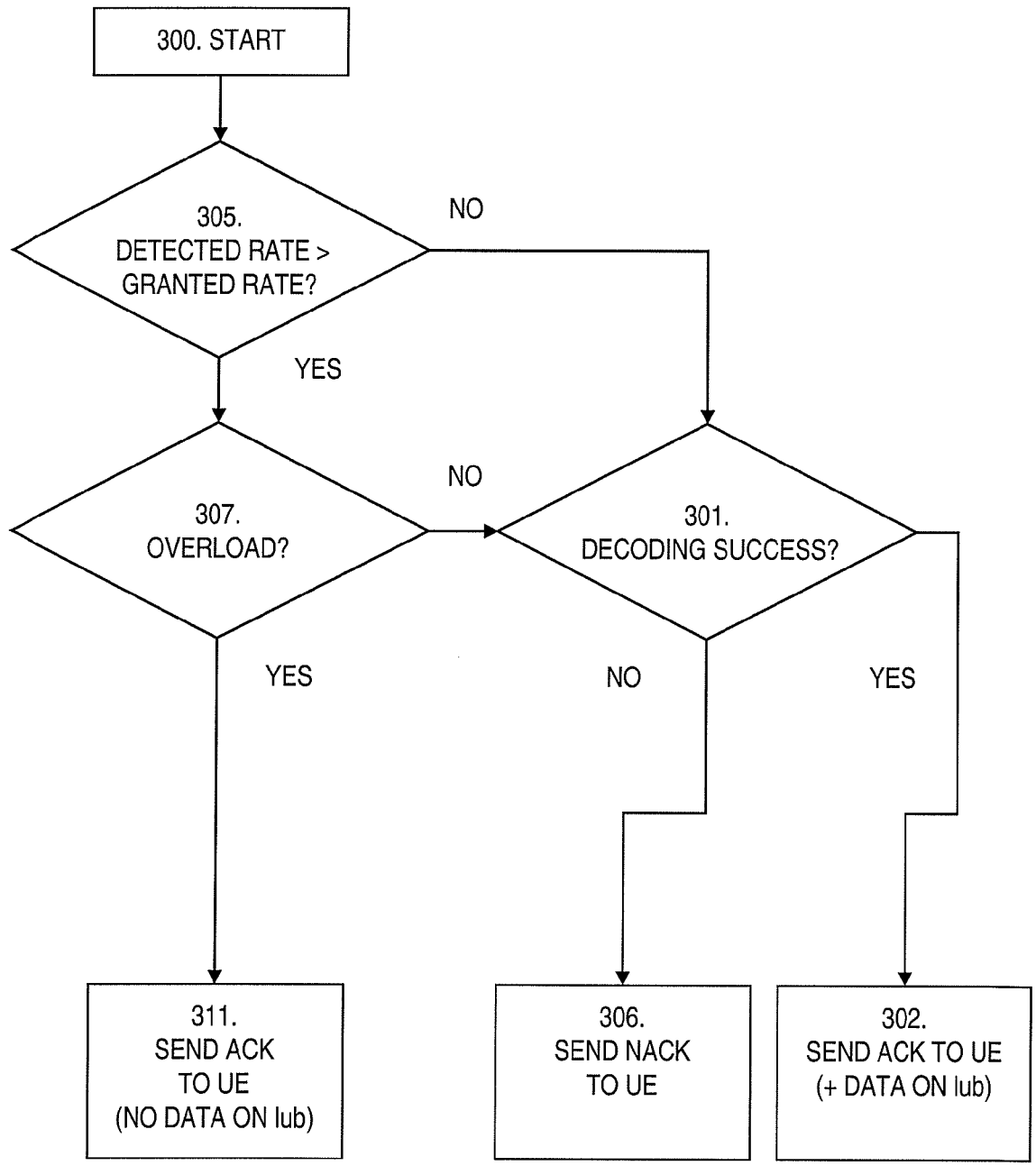
FIG. 6 shows a third embodiment of a method according to invention.

In FIG. 6, a still further embodiment is shown. This embodiment of the method of the invention has the same functional elements as the FIG. 4 embodiment; however, the steps are arranged in an alternative fashion. In step 306, NACK is sent. In step 302, ACK is transmitted with uplink data being forwarded towards the core network and in step 311, an ACK is transmitted without such data.

After step 300, start, the method goes to step 305. If no in step 305 go to step 301, if yes, go to step 307. From 307, in case of yes, go to step 311, and if no go to step 301. From 301, go to 306 in case of no and to 302 in case of yes.

The FIG. 6 embodiment may hence be characterized by moreover detecting whether a decoding success exists 301, and if the detected rate does not exceed the granted rate 305 and a decoding success 301 exists, transmitting 302 an ACK and forwarding the received uplink data to the core network.

Moreover, the step of detecting a decoding success 301 is performed upon detecting 305 that the detected rate does not exceed the granted rate or upon that no overload situation is found to exist 307.

Figure 7:
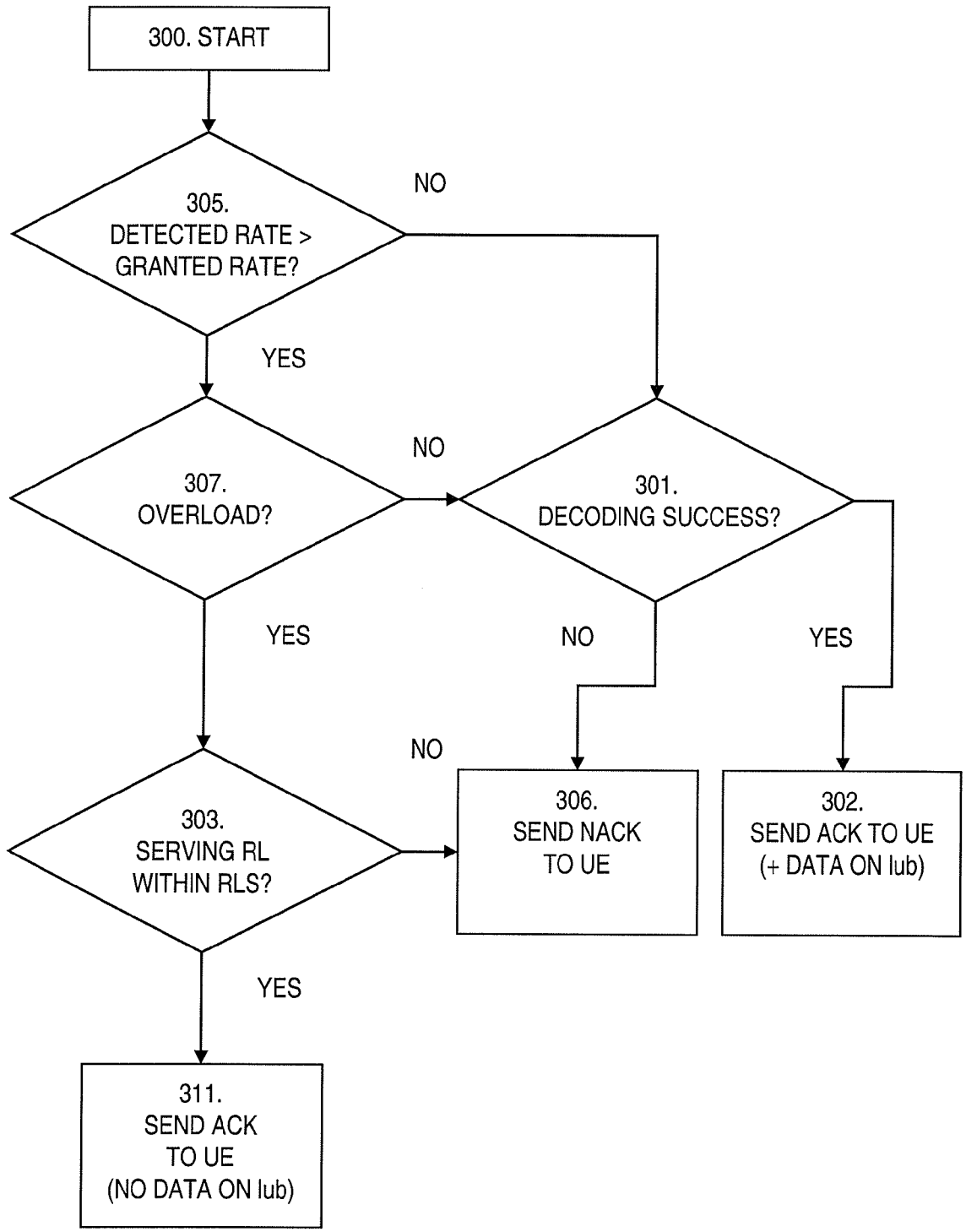
FIG. 7 shows a fourth embodiment of a method according to invention.

In FIG. 7, the FIG. 6 embodiment is expanded with step 303 being inserted between steps 307 and 311, such that if yes in step 307, go to step 303, if no in step 303, go to 306 and if yes in 303, go to 311.

A preferred regulation of the grant level according to the invention for all the variants disclosed above, involve that Node B "changes back" the UE's grant according to the perception Node B has gained of UE transmissions. As mentioned above, the grant level regulation is done in parallel with the ACK/NACK handling, and may be performed as shown in FIG. 3. Hence, if the detected rate exceeds the granted rate 503, the granted rate is repeated 504.

The methods explained above may be adapted for operating according to High Speed Uplink Packet Access and the base station is a node B.

Exemplary Scenarios

FIG. 8 is an exemplary scenario of an all-grant HARQ process according to the prior art, is shown in tabular format for which the maximum number of re-transmissions set to a value of 2. FIG. 9 is an exemplary scenario for the invention according to the method shown in FIG. 4 for basically the same conditions as shown in FIG. 8.

The tables show under the Node B column, the HARQ process number, the E-HICH signal being an ACK or a NACK, whether data is transmitted over IuB protocol interface further to the core network and the E-TFCI value concerning grants. Under the UE column, the perceived grant by the UE is shown as well as the E-DCH transmission in terms of perceived E-TFCI value or alternatively not perceiving any value, DTX. Moreover, the retransmission sequence number RSN is indicated for the HARQ process.

In FIG. 8 it is observed that a grant with value E-TFCI 30 is issued at HARQ process 3, RSN=0, 601, and correctly perceived by the UE. Data is transmitted towards the core network on the IuB interface. Successful transmission continues for the next HARQ processes 4 and 5, 603.

However, in HARQ process 6, 604, the Node B does not decode the uplink transmission form the UE and responds with a NACK. The UE on the other hand perceives a grant with an all-HARQ E-TFCI 120, which is erroneous and hence a ghost grant.

The node B can not process the transmission at this rate and continues to issues NACKs, from HARQ 7, RSN=0, instance 608, to HARQ 5, RSN=0.

In instance 610, Node B issues a repeat of E-TFCI=30, according to step 504 of FIG. 3, which corresponds to the previous issued grant. Node B continues not to be able to decode at this rate and responds with NACK. The UE perceives this repeated grant correctly but transmits at rate 120 for retransmission numbers RSN 1 and 2 since re-transmission continue until being acknowledged or until a maximum number of re-transmissions is reached.

This pattern, or tail, continues for retransmissions RSN 1 and 2 until instance 613. At this moment, the retransmissions has "timed out" and new data is transmitted on HARQ process 6, RSN=0, for which the UE changes transmissions to the desired level E-TFCI 30 and at which moment data can be decoded by the base station correctly why the Node responds with ACKs. Data is present on the IuB interface. It is noted that when re-transmissions time-out, RLC re-transmissions will be triggered.

In FIG. 9, the scenario for an all-grant HARQ process for the invention is shown. It is seen that the initial pattern is the same as shown in FIG. 8. However, at instance 704, which as shown in FIG. 9 corresponds with HARQ process 6, the base station is not able to decode the uplink transmission at E-DCH transmission rate 120 in which an overload situation is detected—e.g. due to lack of processing resources; and Node B responds by transmitting an ACK (see step 311 of FIG. 4). As shown in FIG. 9, the Node B responds with ACK's for the HARQ processes that follow HARQ process 6 (i.e. HARQ processes 7, 0, 1, 2, 3, 4 and 5). It is noted that no data is present on the IuB interface despite the ACK in 704 (c.f. ACK*). Although not according to the standardized MAC (Media Access Control) regulation, the behavior according to the invention leads to the avoidance of an unnecessary tail of un-decodable re-transmissions before it finally leads to RLC upper layer retransmissions.

At instance 710, since the previous transmission was acknowledged, the UE starts sending new non-retransmitted data having RSN=0 following the new corrected grant corresponding to E-TFCI 30, while repeating the scheduled rate, step 504. This data is decoded successfully by Node B according to step 301 and the following tail of un-decodable data is avoided.

FIG. 10 is an exemplary scenario of a single-grant HARQ process according to the prior art. At instance 801, HARQ process 3, an absolute grant E-TFCI 97 is issued, which is received intact at the UE. The other HARQ processes 0-2 and 4-5 are DTX transmissions without data.

At instance 803, HARQ 6, the UE perceives a ghost AG at level E-TFCI 80 for the all HARQ. The Node B is not cable of decoding the transmissions at this level (for any HARQ process except HARQ process 3) and respond with NACKs for subsequent transmissions which is begun by the UE since perceiving the ghost AG for HARQ's 7-2.

HARQ 3, at instance 805 is correctly decoded at E-TFCI 80 and responded by with an ACK and data is transmitted on the IuB interface. That is not the case in 807 RSN=0 at E-TFCI 80 where Node B is only prepared to receive data on HARQ 3.

In 809, a "Deactivate" signal is transmitted from Node B, which is received at the UE. Deactivate is a signal known in the art which is transmitted on E-AGCH with an Absolute Grant Index corresponding to "deactivate" and with HARQ scope set to "per HARQ" according to step 503, 504 FIG. 3. But since the UE received a NACK it continues with re-transmissions (RSN>0). The same is procedure is repeated for following HARQ processes 7, 0, 1, 2, 4, and 5. In instance

811, for HARQ 3, the transmission is decoded correctly at Node B and Node B repeats E-TFCI 97 with grant scope set to "per HARQ" to restore the previous grant level. This step is optional but lets the UE utilize all resources that Node B has reserved for it.

FIG. 11 shows the corresponding example for the invention, again explained with reference to the FIG. 4 embodiment. It is seen that in 903, the Node B responds with an ACK (ACK*) in HARQ process 6, step 311, although not decoding uplink transmissions, according to step 301, and therefore not being able to transmit data on the IuB interface. In instance 909, in HARQ process 6, the UE receives a "Deactivate" and with HARQ scope set to "per HARQ" according to set 503, 504 FIG. 3 and the UE does not transmit—DTX—on the following HARQs. The same procedure is repeated for HARQ process 7, 0, 1, 2, 4 and 5.

In instance 910, for HARQ 3, the transmission is decoded correctly at Node B and Node B repeats E-TFCI 97 with grant scope set to "per HARQ" to restore the previous grant level. This step is optional but lets the UE utilize all resources that Node B has reserved for it.

For this example, the outcome is substantially the same as for the prior art as seen with respect to the amount of transmitted data on the IuB interface. However, on the radio interface, the interference is reduced, since the DTX—no data—transmissions are carried out much earlier than in the prior art.

Base Station According to an Embodiment

Figure 12:
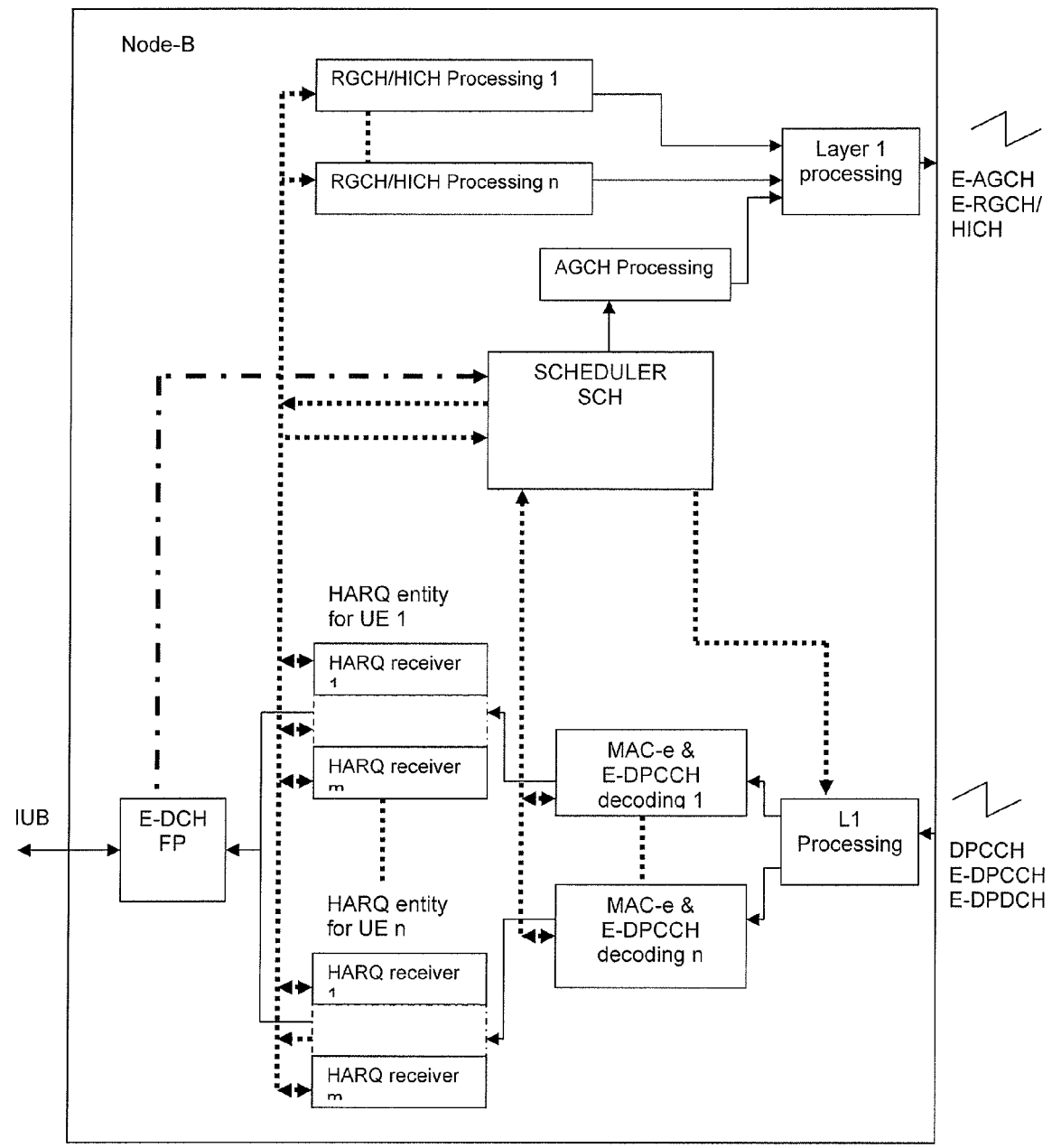
FIG. 12 shows an exemplary base station according to the invention.

In FIG. 12, an exemplary base station according to the invention is shown, also denoted Node B, being capable of operating both as a serving base station and as a non-serving base station.

The base station comprises E-RGCH/HICH processing stages 1-*n*, layer 1 processing, E-AGCH processing, a scheduler, respective HARQ entities for user entities 1-*n*, each HARQ entity comprising plurality of HARQ receivers for receiving packets 1-*m* according to the HARQ process for each user entity. Node B moreover comprises Layer 1 processing means for communicating over E-AGCH and E-RGCH channels over the air interface, L1 processing means for communicating over DPCCH, E-DPCCH and E-DPDCCH channels. Moreover, the base station comprises E-DPCH FP means for communicating over the iub interface. MAC-e E-DPCCH decoding means 1-*n* is provided for HARQ entities for UE 1-*n*. According to the invention, the method steps concerning Node B according to the invention may be implemented in the scheduler.

Further functionalities of the base station are as explained above with reference to the first, second, third and fourth embodiments.

Hence there is provided a base station comprising a scheduler (SCH), the scheduler being adapted for scheduling and receiving uplink transmissions from user entities and further delivering data related to such uplink transmissions to a core network.

The base station being adapted for transmitting serving grant signals for allowing a user entity to transmit uplink transmissions at a given maximum granted data rate, at least at a subsequent transmission opportunity; wherein an uplink transmission from a user entity may be responded to by the scheduler by a not-acknowledge, NACK, or an acknowledge, ACK, signal; the scheduler further being adapted for: detecting 305 the rate of an uplink transmission; detecting 307 whether an overload situation exists; if the rate exceeds the granted rate 305 and an overload situation exists 307, the scheduler being adapted for sending 311 an ACK to the user entity, although without forwarding any uplink data to the core network.

Base station may moreover be adapted for detecting whether a decoding success exists 301, and if so the scheduler being adapted for transmitting 302 an ACK and forwarding data to the core network.

The scheduler may be adapted for detecting 305 whether the detected rate exceeds the granted rate and/or the scheduler detecting 307 whether an overload situation exists is/are performed upon detecting a decoding success does not exist 301.

Upon the scheduler detecting that a decoding success does not exist, if either the detected rate does not exceed the granted rate 305 or if no overload situation is found to exist 307, the scheduler may be adapted for transmitting 306 a NACK to the user entity.

The base station may further involve that the scheduler is detecting whether the serving radio link pertaining to the base station is within a radio link set 303, and if this is not the case, upon the scheduler detecting that a decoding success does not exist, the scheduler being adapted for transmitting a NACK 306.

The scheduler moreover being adapted for detecting whether a decoding success exists 301, and if the scheduler detects that the rate does not exceed the granted rate 305 and a decoding success 301 exists, the scheduler being adapted for transmitting 302 an ACK and forwarding the received uplink data to the core network.

For example, the scheduler detecting a decoding success 301 is performed upon the scheduler detecting 305 that the detected rate does not exceed the granted rate or upon that no overload situation is found to exist 307.

The scheduler detecting whether the serving radio link is within the radio link set 303, the transmission of an ACK 311 by the scheduler without forwarding any uplink data to the core network may be further conditioned on that the serving radio link is within the radio link set 303.

The base station may further comprise the scheduler undertaking detecting 309 whether the user entity is in soft handover with regard to the base station, the transmission of an ACK 311 by the scheduler without forwarding any uplink data to the core network being further conditioned on that the transmission from the user entity is not being in soft handover 309.

The base station may further comprise the scheduler undertaking detecting 309 whether the user entity is in soft handover with regard to the base station and of detecting a retransmission number for the uplink transmission, wherein the transmission of an ACK 311 by the scheduler without forwarding any uplink data to the core network being further conditioned on that the transmission from the user entity is not being in soft handover 309 and the transmission from the user entity is a retransmission 310 having a retransmission number above or equal to a predefined number (X=1 ... 3).

The base station may furthermore undertake that if the detected rate exceeds the granted rate 503, repeating the granted rate 504.

The base station may be a node B adapted for operating according to High Speed Uplink Packet Access.

The invention claimed is:

1. A method in a base station that is adapted for: (i) scheduling and receiving uplink transmissions from user entities, (ii) forwarding data related to such transmissions to a core network, and (iii) transmitting serving grant signals for allowing a user entity to transmit uplink transmissions at a given maximum granted data rate, at least at a subsequent transmission opportunity, wherein the base station may respond to an uplink transmission from a user entity by a not-acknowledge (NACK) signal or an acknowledge (ACK) signal, the method comprising:

detecting the rate of an uplink transmission;
detecting whether an overload situation exists;
detecting whether the rate of the uplink transmission exceeds a granted rate; and
if the rate exceeds the granted rate and an overload situation exists, sending an ACK to the user entity without forwarding to the core network any uplink data from the uplink transmission.

2. The method according to claim 1, further comprising detecting whether a decoding success exists, and if so transmitting an ACK and forwarding data to the core network.

3. The method according to claim 2, wherein the step of detecting whether the detected rate exceeds the granted rate and/or the step of detecting whether an overload situation exists is/are performed in response to detecting a decoding success does not exist.

4. The method according to claim 2, further comprising, after detecting that a decoding success does not exist, transmitting a NACK to the user entity if either the detected rate does not exceed the granted rate or if no overload situation is found to exist.

5. The method according to claim 2, further comprising the step of detecting whether the serving radio link pertaining to the base station is within a radio link set, and if this is not the case, upon detecting that a decoding success does not exist transmitting a NACK.

6. The method according to claim 1, further comprising detecting whether a decoding success exists, and if the detected rate does not exceed the granted rate and a decoding success exists, then transmitting an ACK and forwarding the received uplink data to the core network.

7. The method according to claim 6, wherein the step of detecting a decoding success is performed upon detecting that the detected rate does not exceed the granted rate or upon that no overload situation is found to exist.

8. The method according to claim 1, further comprising the step of detecting whether the serving radio link is within the radio link set, the transmission of an ACK without forwarding any uplink data to the core network being further conditioned on that the serving radio link is within the radio link set.

9. The method according to claim 1, further comprising the step of detecting whether the user entity is in soft handover with regard to the base station, the transmission of an ACK without forwarding any uplink data to the core network being further conditioned on that the transmission from the user entity is not being in soft handover.

10. The method according to claim 1, further comprising the step of detecting whether the user entity is in soft handover with regard to the base station and the step of detecting the retransmission number for the uplink transmission, wherein
the transmission of an ACK without forwarding any uplink data to the core network being further conditioned on that the transmission from the user entity is not being in soft handover and the transmission from the user entity is a retransmission having a retransmission number above or equal to a predefined number (X=1 . . . 3).

11. The method according to claim 1, wherein, if the detected rate exceeds the granted rate, the granted rate is repeated.

12. The method according to claim 1, wherein method is adapted for operating according to High Speed Uplink Packet Access and the base station is a node B.

13. A base station, the base station being configured to:
detect the rate of an uplink transmission from a user entity;
detect whether an overload situation exists;
detect whether the detected rate exceeds a granted rate;
send an ACK to the user entity without forwarding to a core network any uplink data included in the uplink transmission as a result of determining that the detected rate exceeds the granted rate and an overload situation exists.

14. The base station according to claim 13, wherein the base station is configured to send an ACK to the user entity and forward to the core network uplink data included in the uplink transmission as a result of detecting that a decoding success exists with respect to the uplink transmission.

15. The base station according to claim 14, wherein the base station is configured such that the base station detects whether an overload situation exists and whether the detected rate exceeds a granted rate as a result of the base station detecting that a decoding success dos not exist with respect to the uplink transmission.

16. The base station according to claim 14, wherein the base station is configured to send a NACK to the user entity as a result of (a) detecting that a decoding success does not exists with respect to the uplink transmission and (b) detecting that no overload situation exits or that the detected rate does not exceed the granted rate.

17. The base station according to claim 14, wherein the base station is further configured to detect whether a serving radio link pertaining to the base station is within a radio link set, and if this is not the case, upon detecting that a decoding success does not exist, the base station being adapted for transmitting a NACK to the user entity.

18. The base station according to claim 13, wherein the base station is further adapted for detecting whether a decoding success exists, and
if the base station detects that the rate does not exceed the granted rate and a decoding success exists, the base station being adapted for
transmitting an ACK and forwarding the received uplink data to the core network.

19. The base station according to claim 18, wherein the base station is further adapted such that the base station performs the step of detecting decoding success after the base station detecting that the detected rate does not exceed the granted rate or upon that no overload situation is found to exist.

20. The base station according to claim 13, wherein
the base station is further adapted to detect whether a serving radio link is within a radio link set, and
the transmission of an ACK by the base station without forwarding any uplink data to the core network is further conditioned on that the serving radio link is within the radio link set.

21. The base station according to claim 13, wherein
the base station is further adapted to detect whether the user entity is in soft handover with regard to the base station, and
the transmission of an ACK by the base station without forwarding any uplink data to the core network is further conditioned on that the transmission from the user entity is not being in soft handover.

22. The base station according to claim 13, wherein the base station is further adapted to detect whether the user entity is in soft handover with regard to the base station and detect a retransmission number for the uplink transmission, and
the transmission of an ACK by the base station without forwarding any uplink data to the core network is further conditioned on that the transmission from the user entity is not being in soft handover and the transmission from the user entity is a retransmission having a retransmission number above or equal to a predefined number.

23. The base station according to claim 13, wherein the base station is further adapted to repeat the granted rate if the detected rate exceeds the granted rate.

24. The base station according to claim 13, wherein the base station is a node B adapted for operating according to High Speed Uplink Packet Access.

\* \* \* \* \*

UNITED STATES PATENT AND TRADEMARK OFFICE
CERTIFICATE OF CORRECTION

| | | |
|---|---|---|
| PATENT NO. | : 8,976,654 B2 | Page 1 of 1 |
| APPLICATION NO. | : 13/359971 | |
| DATED | : March 10, 2015 | |
| INVENTOR(S) | : Ankel et al. | |

It is certified that error appears in the above-identified patent and that said Letters Patent is hereby corrected as shown below:

In the specification

In Column 1, Line 17, delete "ACKJNACK" and insert -- ACK/NACK --, therefor.

In Column 6, Line 21, delete "ACKfNACK" and insert -- ACK/NACK --, therefor.

In Column 7, Line 1, delete "Tub" and insert -- Iub --, therefor.

In Column 7, Line 33, delete "perfolins" and insert -- performs --, therefor.

In Column 7, Line 46, delete "or-an" and insert -- or an --, therefor.

In Column 9, Line 64, delete "form the" and insert -- from the --, therefor.

In Column 10, Line 30, delete "(i.e." and insert -- (i.e., --, therefor.

In Column 10, Line 64, delete "504 FIG. 3." and insert -- 504 of FIG. 3. --, therefor.

In Column 11, Line 14, delete "504 FIG. 3" and insert -- 504 of FIG. 3 --, therefor.

In the claims

In Column 14, Line 14, in Claim 15, delete "dos not" and insert -- does not --, therefor.

Signed and Sealed this
Twenty-third Day of February, 2016

Michelle K. Lee
*Director of the United States Patent and Trademark Office*